March 17, 1925.

A. L. RYAN

PRESSURE GAUGE

Filed March 3, 1924

1,530,093

Inventor:
ALVA L. RYAN.
By Ralph Vonath
Paul Kinchard
Attorneys.

Patented Mar. 17, 1925.

1,530,093

UNITED STATES PATENT OFFICE.

ALVA L. RYAN, OF PITTSBURGH, PENNSYLVANIA, ASSIGNOR OF ONE-HALF TO WILLIAM J. ARTZ, OF PITTSBURGH, PENNSYLVANIA.

PRESSURE GAUGE.

Application filed March 3, 1924. Serial No. 696,497.

*To all whom it may concern:*

Be it known that I, ALVA L. RYAN, a citizen of the United States, residing at Pittsburgh, in the county of Allegheny and State of Pennsylvania, have invented certain new and useful Improvements in Pressure Gauges, of which the following is a specification.

This invention relates to pressure gauges and more in particular to tire-pressure gauges.

One of the principal objects of this invention is to provide a tire pressure gauge which will indicate the pressure of air forced into a tire. Another important object of this invention is to provide a pressure gauge which will automatically cut off the air supply after a desired pressure has been attained within the tire. A further object is to provide a pressure gauge which can be permanently adjusted, within its limits of operation, to cut off the air supply upon reaching a predetermined pressure in the tire. Still another object is to provide a pressure gauge which is positive in action, compact and which can be manufactured at relatively low cost. Additional features and advantages of this invention will appear from the following description considered in connection with the accompanying drawings in which—

Figures 1, 2:
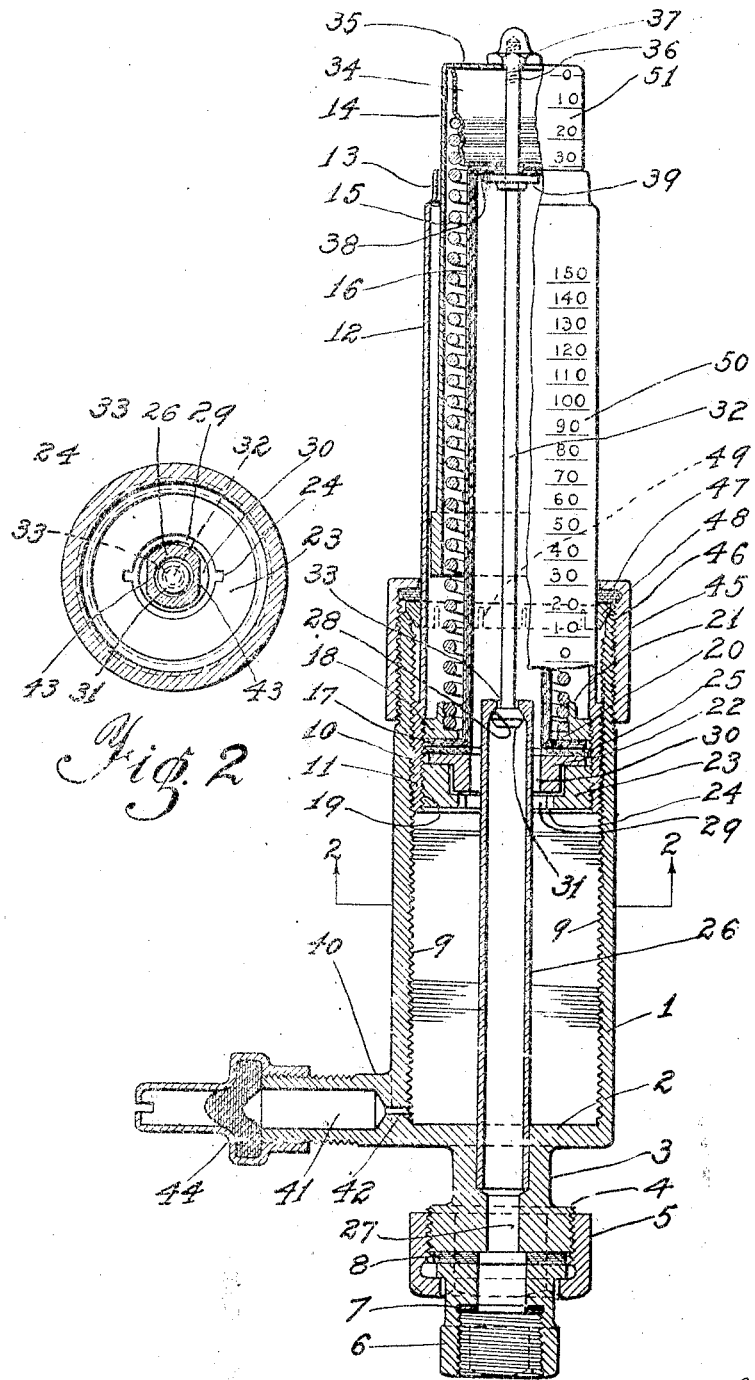
Fig. 1 represents a longitudinal cross-section, greatly enlarged, of the automatic tire pressure gauge.
Fig. 2 is a cross-section taken substantially on line 2—2 in Fig. 1.

Reference being had to the drawing, the preferred construction comprises a gauge body 1, open at the top and having a bottom 2 provided with a central hollow shank 3 the lower end of which has a suitably threaded portion 4 to accommodate a coupling 5 by means of which is secured the flanged union member 6 centrally drilled and properly threaded to be connected to the usual inflating valve (not shown) with which all pneumatic tires are furnished. Suitable gaskets 7 and 8 are also used to insure leak-proof connections.

The inside of the gauge body is threaded substantially down to the bottom, as indicated by numeral 9, said thread being engaged by the outward thread 10 on the lower portion 11 of the pressure adjusting sleeve 12, the upper end 13 of which is open and slightly reduced in diameter to form a guiding and limiting means for the tubular pressure indicator cap 14.

Positioned within the indicator cap 14 is a calibrated coiled wire spring 15 inside of which is an expansible tube 16 closed at the top and having an outside flange 17 at its open lower end, said expansible tube being preferably made of very resilient rubber. The lower end of the spring 15 is secured to the adjusting sleeve 12, near the bottom thereof, by means of an outwardly threaded ring 18 which engages the inward threads 19 cut in said adjusting sleeve. This ring is partly counterbored to provide a seat 20 for the spring and has a collar 21 which is pressed around the lower turns of the spring, thus securely holding them.

The flange of the rubber tube 16 is clamped between the flat bottom of the ring 18 and a loose ring 22 which is pressed against the flange by means of an outwardly threaded nut 23, also engaging the inside thread of the adjusting sleeve. To facilitate the application of said nut, suitable slots or notches 24 are cut in the base thereof for inserting a flat screw driver or similar tool. As shown in Fig. 1, an intermediate disc 25, preferably of a composition of rubber and fabric, is inserted next to the flange of the rubber tube to increase the thickness of said flange and take up the wear thereof.

The automatic closing mechanism of this pressure gauge comprises an inlet tube 26 secured centrally in the bottom 2 of the gauge body and communicating with the inlet aperture 27 provided therein. The top of the inlet tube is partly closed and is inwardly shaped to form the valve seat 28. The length of the inlet tube is such that it will at all times protrude within the rubber tube and its diameter is only slightly less than the size of the central apertures 29 and 30 provided respectively in the nut 23 and loose ring 22; thus insuring the inlet tube against distortion due to hard shocks or abuse. To allow greater space for the passage of air into the tube 16, two or more sides of the inlet tube may be flattened, as shown by the numeral 43, in Fig. 2.

Freely mounted for longitudinal movement within the inlet tube is the properly shaped valve disc 31, the stem 32 of which passes through a somewhat larger aperture 33 provided in the top of said inlet tube.

Said stem must be of very definite length (for a purpose to be stated later) and passes through a special thimble 34 secured in the top of the coil spring and through the top 35 of the indicator cap 14. Its outer end is also provided with screw threads 36 on which is secured an acorn-shaped nut 37. Bearing against the underside of the tube-top 38 is a disc 39 securely mounted on the valve stem. It will thus be seen that, once the acorn-nut is applied, the indicator cap will follow the outward and inward movements of the coil spring and rubber tube.

The air from the supply source is introduced into the gauge and tire through the outwardly threaded lateral pipe nipple 40 made integral with the gauge body. This nipple is preferably drilled to two diameters 41 and 42, the latter being very much reduced in order to limit the sudden rush of too great a volume of air into the gauge. This reduction is especially advisable when the supply of air is of very much greater pressure than the one required within the tire. When not in use, the nipple is sealed by means of a standard tire valve-cap 44, too well known in the trade to require detailed description.

The outward longitudinal travel of the adjusting sleeve 12 within the gauge body is limited by means of the inwardly threaded ferrule 45 which engages corresponding threads 46 cut on the gauge body. This ferrule also presses upon a packing ring 47 bearing upon the beveled follower ring 48 which is made sufficiently resilient by having suitable slots 49 cut around its circumference. By forcing the ferrule down upon the packing ring, the connection between the gauge body and the adjusting sleeve will be made leak-proof and the latter will also be locked in any selected position.

Upon the indicator cap and the adjusting sleeve are placed oppositely marked scales 50 and 51 having reference to the air pressure within the tire.

The mode of operation of this tire gauge is as follows: Referring to Fig. 1 and assuming that an air pressure of slightly over thirty pounds is to be charged into the tire, the ferrule 45 is first loosened a little to unlock the adjusting sleeve 12 and the latter is then screwed down into the gauge body until the scale 50 reads slightly above thirty pounds. The pipe union 6 is now screwed onto the valve of the tire (not shown) to be inflated and the pipe nipple is then connected to an air supply hose; the tire valve-cap 44 having, of course, first been removed. As the air enters the gauge body, the pressure indicating cap 14, which up to that time had been forced down to the zero-reading by the coil spring, will now gradually rise until it reads slightly over thirty pounds pressure, at which moment the valve disc 31 will bear against its seat 28 and interrupt the passage of air into the tire, said air having heretofore passed through the aperture 33 into the inlet tube 26 and thence into the tire. As stated before, the length of the inlet tube and the valve stem must be definitely established in order to assure the closing of the air supply into the tube whenever the pressure indicator cap indicates the pressure to which the adjusting sleeve has been set. Slight adjustments of the valve may be obtained by means of the acorn-nut 37, owing to the resiliency of the top 38 of the expansive tube which can be compressed more or less by the disc 39.

The device may also be used like an ordinary tire pressure gauge, it is, (independently of the air supply line) to indicate the pressure prevailing in a tire. To do this, the tire cap 44 is left on the pipe nipple 40 and the adjusting sleeve is screwed into the gauge body down to a pressure greater than the one expected in the tire. The gauge is then applied to the tire valve and the pressure in the tire will be indicated directly by the scale on the indicator cap 14.

Also, should the operator wish to introduce a greater pressure than the one he had first intended to use and for which he has already set the adjusting sleeve, he may do so by simply pushing the indicator cap down with his thumb until the tire has been blown up to his satisfaction, as ascertained by feeling the tire.

Although the primary intention of this invention is to provide a gauge especially adapted for inflating pneumatic tires, it is evident that the same device could be made to suit other applications where fluid pressures are to be measured. It will be understood, of course, that the arrangement I have herein shown and described is susceptible of many slight changes in construction and disposition of the detail parts without departing from the field and scope of the same, and I intend to include all such variations as fall within the scope of the appended claims, in this application in which the preferred form of my invention has been disclosed.

What I claim is:

1. A pressure gauge comprising a gauge body; connecting means to a supply of fluid pressure; connecting means to a pressure receiving container; an adjustable sleeve longitudinally movable within said gauge body; a pressure indicator movable within said adjustable sleeve; an air inlet tube secured to and within said gauge body and adapted to communicate with said receiving container; a valve seat provided within said inlet tube and at the upper end thereof, and a valve member secured to said pressure indicator and movable within said inlet tube for engagement with said valve seat.

2. A pressure gauge comprising a gauge body; connecting means to a supply of fluid pressure; connecting means to a pressure receiving container; an adjustable sleeve longitudinally movable within said gauge body; means to lock said adjustable sleeve into any selected position within said gauge body; a pressure indicator movable within said adjustable sleeve; an air inlet tube secured to and within said gauge body and adapted to communicate with said receiving container; a valve seat provided within said inlet tube and at the upper end thereof; and a valve member secured to said pressure indicator and movable within said inlet tube for engagement with said valve seat.

3. A pressure gauge comprising a gauge body; connecting means to a supply of fluid pressure; connecting means to a pressure receiving container; an adjustable sleeve longitudinally movable within said gauge body; a pressure indicator movable within said adjustable sleeve; an air inlet tube secured to and within said gauge body and adapted to communicate with said receiving container; a valve seat provided within said inlet tube and at the upper end thereof; a valve member secured to said pressure indicator and movable within said inlet tube for engagement with said valve seat, and means for longitudinally adjusting the position of said valve member within said inlet tube.

4. A pressure gauge comprising a gauge body; connecting means to a supply of fluid pressure; connecting means to a pressure receiving container; an adjustable sleeve longitudinally movable within said gauge body; means to lock said adjustable sleeve into any selected position within said gauge body; a graduated scale positioned upon said adjustable sleeve; a pressure indicator movable within said adjustable sleeve and having a graduated scale thereon arranged to read in opposite direction to said first named scale; an air inlet tube secured to and within said gauge body and adapted to communicate with said receiving container; a valve seat provided within said inlet tube and at the upper end thereof; a valve member comprising a valve disc and stem secured to said pressure indicator and movable within said inlet tube; said inlet tube and valve disc being in such spaced longitudinal relation to cause the engagement of said valve disc with said valve seat when said pressure indicator registers the predetermined pressure set by said adjusting sleeve.

5. A pressure gauge comprising a gauge body, connecting means to a supply of fluid pressure; connecting means to a pressure receiving container; an adjustable sleeve longitudinally movable within said gauge body; a pressure indicator movable within said adjustable sleeve; a calibrated coil wire spring and an expansible tube positioned within said pressure indicator and having each one end secured thereto and the other end secured to said adjustable sleeve; an air inlet tube secured to and within said gauge body and adapted to communicate with said receiving container; a valve seat provided within said inlet tube and at the upper end thereof; a valve member secured to said pressure indicator and movable within said inlet tube for engagement with said valve seat, and means for longitudinally adjusting the position of said valve member within said inlet tube.

6. A pressure gauge comprising a gauge body; connecting means to a supply of fluid pressure; connecting means to a pressure receiving container; an adjustable sleeve longitudinally movable within said gauge body; a pressure indicator movable within said adjustable sleeve; a calibrated coiled wire spring and an expansible tube positioned within said pressure indicator and having each one end secured thereto and the other end secured to said adjustable sleeve; means to adjust said coiled wire spring; an air inlet tube secured to and within said gauge body and adapted to communicate with said receiving container; a valve seat provided within said inlet tube and at the upper end thereof; a valve member secured to said pressure indicator and movable within said inlet tube for engagement with said valve seat; means for longitudinally adjusting the position of said valve member within said inlet tube, and outwardly operable means to lock said adjustable sleeve into any selected position within said gauge body.

In testimony whereof I affix my signature.

ALVA L. RYAN.